United States Patent [19]

Ensign

[11] Patent Number: 5,022,610
[45] Date of Patent: Jun. 11, 1991

[54] RETRACTING RAMP TOE

[75] Inventor: Thomas R. Ensign, Wichita, Kans.

[73] Assignee: The Boeing Company, Seattle, Wash.

[21] Appl. No.: 462,726

[22] Filed: Jan. 9, 1990

[51] Int. Cl.$^5$ .............................................. B64C 1/22
[52] U.S. Cl. .............................. 244/118.3; 244/137.1; 414/480
[58] Field of Search .................... 244/118.3, 137.1; 14/69.5, 71.1; 414/480

[56] References Cited

U.S. PATENT DOCUMENTS

| | | | |
|---|---|---|---|
| 3,374,972 | 3/1968 | Webb, Sr. ........................ | 244/137.1 |
| 4,088,288 | 5/1978 | Barnes ............................ | 244/137.1 |
| 4,140,291 | 2/1979 | Evans et al. ..................... | 244/118.3 |
| 4,235,399 | 11/1980 | Shorey ............................ | 244/137.1 |
| 4,395,000 | 7/1983 | Deviny et al. .................... | 244/118.3 |
| 4,498,648 | 2/1985 | DeLuca et al. ................... | 244/118.3 |

FOREIGN PATENT DOCUMENTS 265726 1/1980 U.S.S.R. .

Primary Examiner—Joseph F. Peters, Jr.
Assistant Examiner—Anne E. Bidwell
Attorney, Agent, or Firm—Finnegan, Henderson, Farabow, Garrett & Dunner

[57] ABSTRACT

A ramp toe system for use with a ramp of an aircraft, the ramp having internal and external surfaces and being pivotally attached at one end of the aircraft. A ramp extension having a proximal end fixed to the other end of the ramp and extending therefrom to a distal end, has an inside surface generally co-planar with the internal surface of the ramp, and an outside surface convergingly extending from the proximal end to the distal end. A ramp toe having first and second opposed ends and first and second opposed surfaces, the first surface convergingly extending from the first end to the second end, is pivotally attached to the distal end of the ramp extension at the first end, for selective movement between a stored position wherein the first surface is generally contiguous with the outside surface of the ramp extension, and an extended position wherein the first surface is disposed to be generally contiguous with the aircraft support surface and the second surface is generally co-planar with the inside surface of the ramp extension.

10 Claims, 5 Drawing Sheets

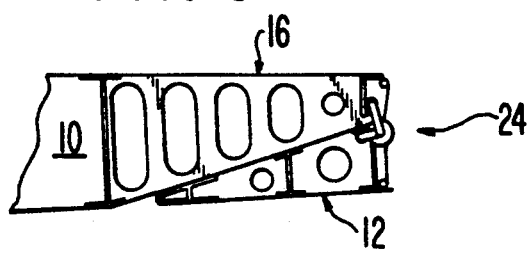
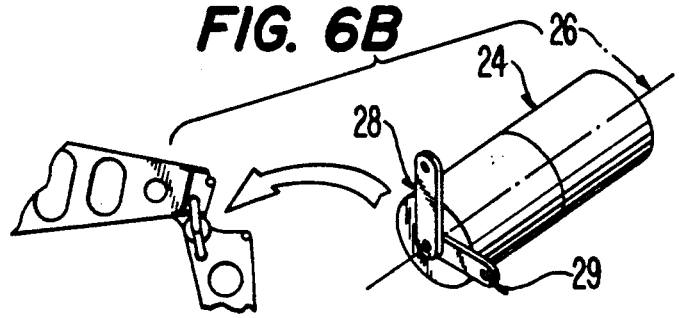
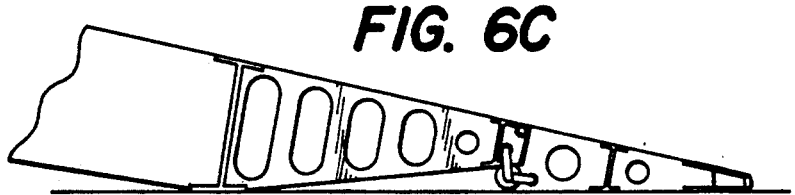
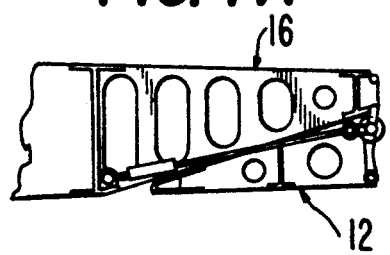
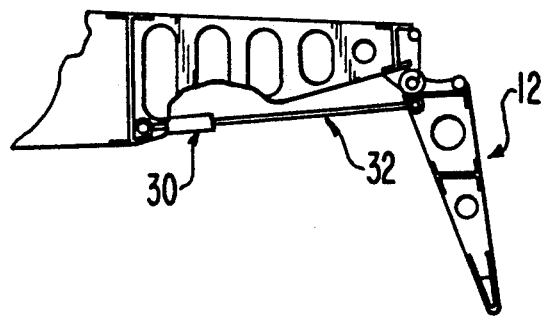
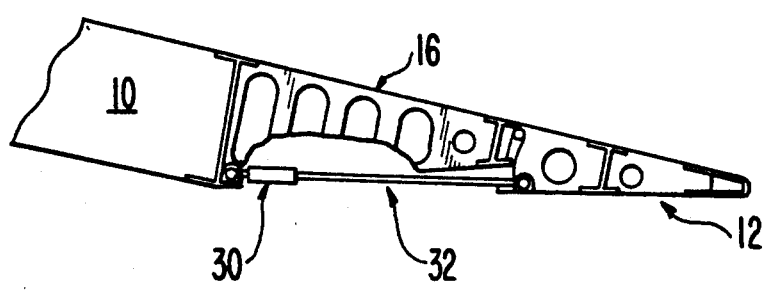

RETRACTING RAMP TOE

BACKGROUND OF THE INVENTION

1. Field of the Invention

The present invention relates to a ramp toe system which is designed to retract a ramp toe of an aircraft ramp between a stored position contiguous with an outer surface of a ramp extension, and an extended position.

2. Description of Related Art

In the aircraft industry, a ramp is normally used to allow wheeled or tracked vehicles to drive on and off an aircraft to facilitate movement of cargo and other equipment. In order for the ramp to have proper strength and stability the end of the ramp needs to be fairly thick, usually about 8 to 10 inches. To bridge the height of the ramp end to the ground during loading or unloading, a ramp toe is needed, as shown in FIG. 1.

Previously, various types of conventional ramp toes have been used. FIG. 2 shows a pair of portable ramp toes. These ramp toes do not extend the entire width of the ramp, thus, making it difficult to align the vehicles upon the ramp toes while loading and unloading cargo. These ramp toes must be manually removed by the aircraft crew and stored inside the aircraft during flight.

Ramp toes that are hinged at the ramp often are stored above the ramp when not in use, as shown by U.S. Pat. No. 4,235,399 to Shorey and FIG. 3. This type of stowage is bulky, inconvenient, and prevents airdrop and parachute extraction of cargo. To alleviate problems, a stowage system can incorporate mechanisms to detach the toe from the ramp and stow the toe above the cargo door. Such a mechanism is shown in U.S. Pat. No. 4,140,291 to Evans et al., and in FIG. 3A. These systems require relatively heavy hardware and are difficult to maintain.

U.S.S.R. 265,726 discloses a ramp toe hinged on the end of a ramp and stored external to the aircraft's fuselage. Such an arrangement forces the ramp to be much longer, heavier, and cumbersome.

The improved ramp toe of the present invention is lightweight and extends the entire width of the ramp. The ramp toe retracts in such a way that it leaves the ramp surface and ramp end clear and operates conveniently; the ramp toe extends and retracts quickly without undue effort by the operator.

Advantages of the invention are set forth in part in the description which follows, and in part will be obvious from the description, or may be learned by practice of the invention.

SUMMARY OF THE INVENTION

In accordance with the invention, as embodied and broadly described herein, a ramp toe system for use with a ramp of an aircraft, the ramp having internal and external surfaces and being pivotally attached at one end to the aircraft for selective movement between a closed position wherein the external surface generally conforms to an outside skin of the aircraft and an open position wherein the other end of the ramp generally is disposed to contact a surface supporting the aircraft, the ramp toe system comprising a ramp extension having a proximal end fixed to the other end of the ramp and extending therefrom to a distal end, the ramp extension having an inside surface generally co-planar with the internal surface of the ramp, and an outside surface convergingly extending from the proximal end to the distal end, a ramp toe having first and second opposed ends and first and second opposed surfaces, the first surface convergingly extending from the first end to the second end, the first end of the ramp toe being pivotally attached to the distal end of the ramp extension for selective movement between a stored position wherein the first surface is generally contiguous with the outside surface of the ramp extension, and an extended position wherein the first surface is disposed to be generally contiguous with the aircraft support surface and the second surface is generally co-planar with the inside surface of the ramp extension, and means for selectively moving the ramp toe between the stored and extended positions.

Preferably, the moving means comprises either a hydraulic actuator and pushrod, or a rotary actuator operatively connecting the ramp toe and the ramp extension.

It should be understood that both the foregoing general description and the following detailed description are exemplary and explanatory only and are not limited by the invention as claimed.

BRIEF DESCRIPTION OF THE DRAWINGS

The accompanying drawings, which are incorporated in and constitute a part of this specification, illustrate embodiments of the invention and together with the description, serve to explain details, features and advantages of the invention.

FIGS. 6A through 6C are partial cutaway side views of one embodiment of the moving means of the present invention in various operative positions.

FIGS. 7A through 7C are partial cutaway side views of another embodiment of the moving means of the present invention in various operative positions.

DESCRIPTION OF THE PREFERRED EMBODIMENT

Figure 1:
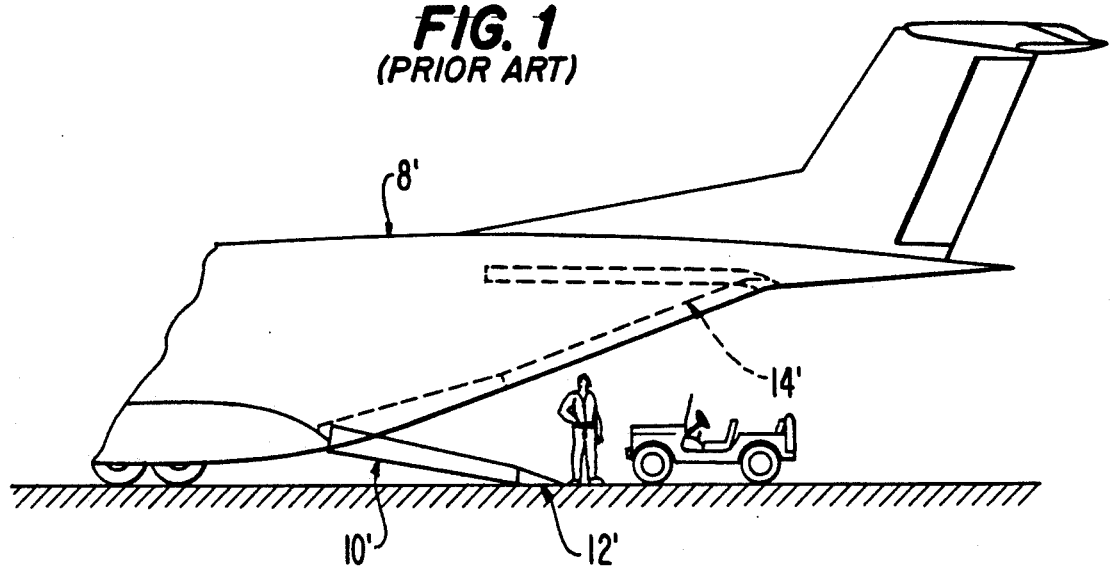
FIG. 1 is a side view of a conventional aircraft ramp and ramp toe.
Figure 2:
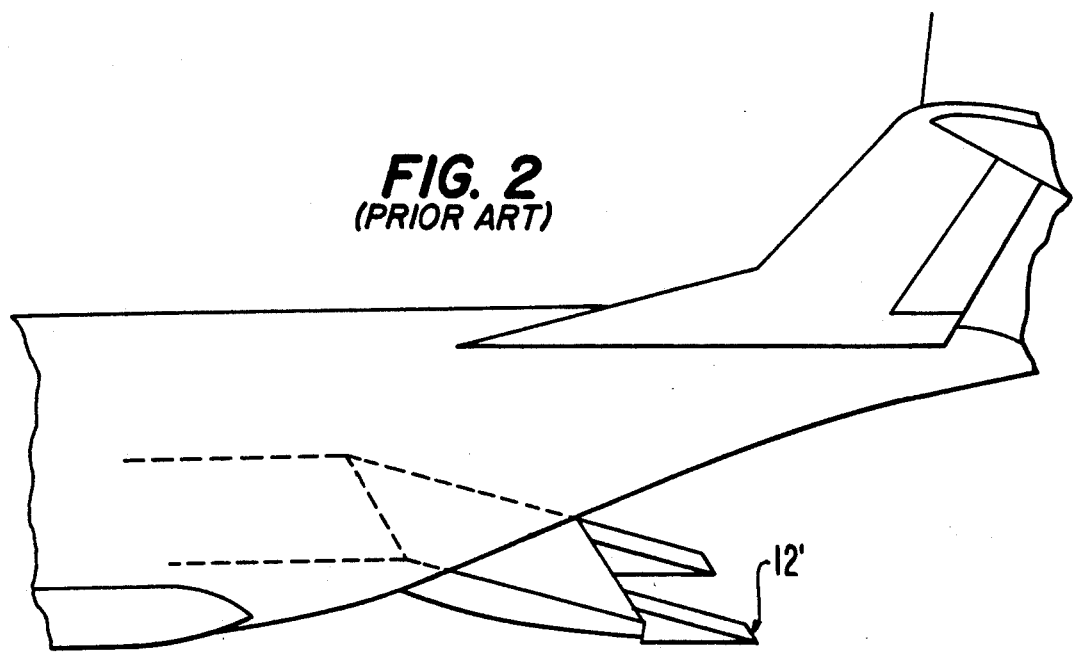
FIG. 2 is a perspective view of a pair of conventional ramp toes.
Figure 3:
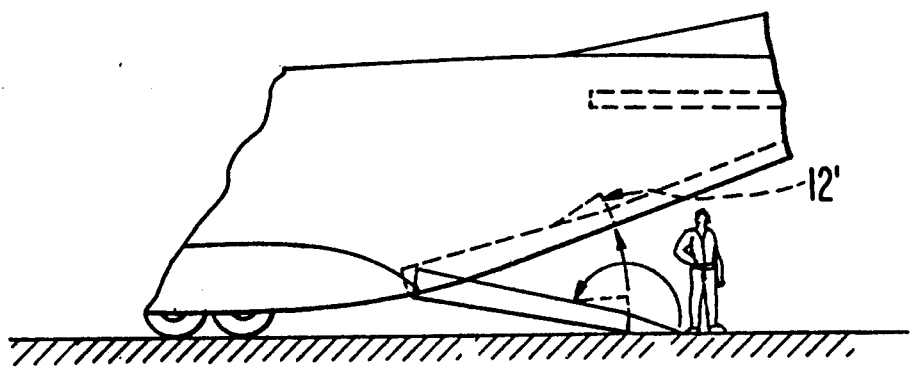
FIG. 3 is a side view of a conventional ramp toe stowage system.
Figure 3A:
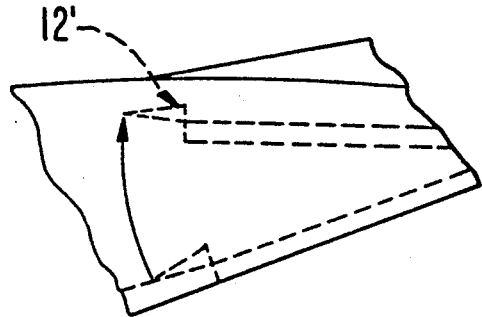
FIG. 3A is an enlargement of the ramp toe stowage system of FIG. 3.

Reference will now be made in detail to the present preferred embodiment of the invention, an example of which is illustrated in the accompanying drawings.

In accordance with the invention, a ramp toe system for use with a ramp of an aircraft, the ramp having internal and external surfaces, the ramp being pivotally attached at one end to the aircraft for selective movement between a closed position wherein the external surface generally conforms to an outside skin of the aircraft and an open position wherein the other end of the ramp generally is disposed to contact a surface supporting the aircraft. As embodied herein and disclosed in FIG. 4, aircraft 8 has a downwardly opening ramp 10 and an upwardly opening cargo door 14, in its tail section. One end 21A of ramp 10 is pivotally attached to aircraft 8 for selective movement between a closed position wherein external surface 11 of ramp 10 conforms to the outside skin of the aircraft forming an aerodynamically efficient shape, and an open position wherein the other end 21B of ramp 10 generally is disposed to contact the surface supporting the aircraft, for example an airport runway. When the ramp is in the closed position, as indicated by the dotted lines in FIG. 4, ramp 10 and cargo door 14 are locked together. Preferably, when ramp 10 and cargo door 14 are disengaged, ramp 10 is designed to open downwardly. The internal surface 9 of the ramp in its open position allows wheeled or tracked vehicles to drive onto or off the aircraft.

In accordance with the invention, the ramp toe system comprises a ramp extension having a proximal end fixed to the other end of the ramp and extending therefrom to a distal end, the ramp extension having an inside surface generally co-planar with the internal surface of the ramp and an outside surface convergingly extending from the proximal end to the distal end. As depicted and embodied in FIG. 5, ramp extension 16 comprises a lightweight rigid extension integrally formed with ramp 10 at proximal end 23A. Outside surface 22 of extension 16 is tapered converging from proximal end 23A to a distal end 23B. Inside surface 20 of ramp extension 16 is co-planar with internal surface 9 of ramp 10 to form a smooth surface for vehicles to drive upon.

Preferably, ramp extension 16 may extend the entire width of ramp 10. As shown in FIGS. 5A and 5B, ramp extension 16 has lugs 27 on the proximal end 23A. Lugs 27 engage lugs 25B of cargo door 14 to lock the ramp and door together, as shown in FIGS. 5C and 5E.

In accordance with the invention, the ramp toe system comprises a ramp toe having first and second opposed ends and first and second opposed surfaces, the first surface convergingly extending from the first end to the second end, the first end of the ramp toe being pivotally attached to the distal end of the ramp extension for selective movement between a stored position wherein the first surface is generally contiguous with the outside surface of the ramp extension, and an extended position wherein the first surface is disposed to be generally contiguous with the aircraft support surface and the second surface is generally co-planar with the inside surface of said ramp extension. As embodied and depicted in FIGS. 5 through 5C the ramp toe 12 has a first surface 13 convergingly extending from the first end 17 to the second end 19. First end 17 is pivotally attached to distal end 23B of ramp extension 16 for selective movement between a stored position wherein first surface 13 is generally contiguous with outside surface 22 of ramp extension 16 and an extended position wherein first surface 13 is generally contiguous with the aircraft support surface and second surface 15 of toe 12 is generally co-planar with inside surface 20 of ramp extension 16.

Figure 5:
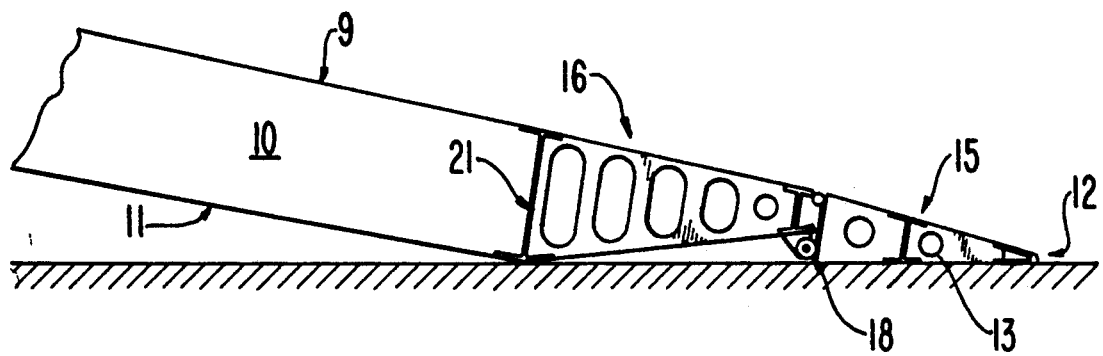
FIGS. 5 through 5E are partial cutaway side views of the ramp, extension and ramp toe of the present invention in various operative positions.
Figure 5A:
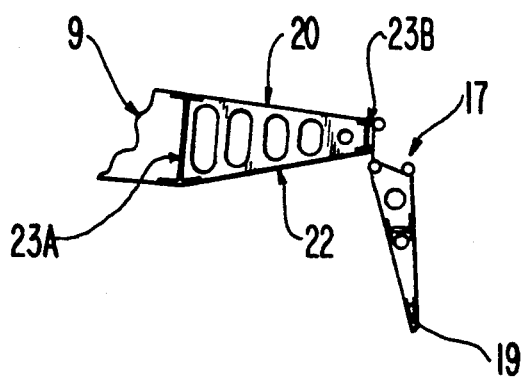
Figure 5B:
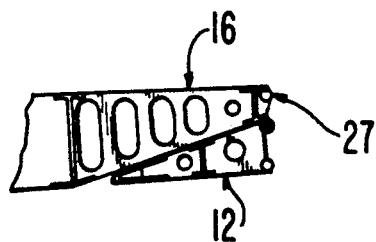
Figure 5C:
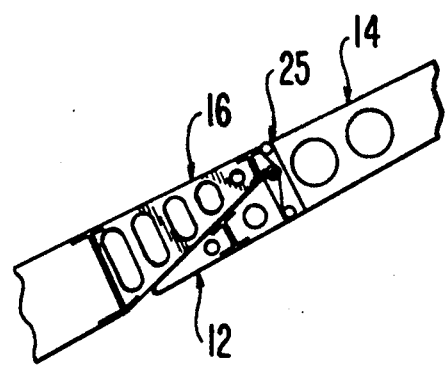

Ramp toe 12 can be selectively moved between an extended position, as shown in FIG. 5, where the first surface 13 of ramp toe 12 is generally contiguous with the supporting surface of aircraft 8, and a stored position wherein first surface 13 is generally contiguous with outside surface 22 of ramp extension 16. While in the stored position as depicted in FIGS. 5B and 5C, first surface 13 of ramp toe 12 is generally contiguous with outside surface 22 of extension 16. Both surfaces 13 and 22 are oppositely tapered wedges, and when the toe is retracted to the stored position, toe 12 lies external to outside surface 22 of ramp extension 16. Thus, when stored the second surface 15 of toe 12 is contiguous with external surface 11 of ramp 10, and when the ramp and cargo door are closed a smooth aerodynamically efficient shape is formed.

Figure 5D:
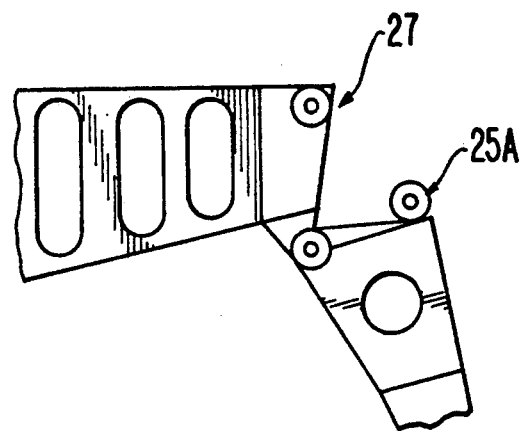
Figure 5E:
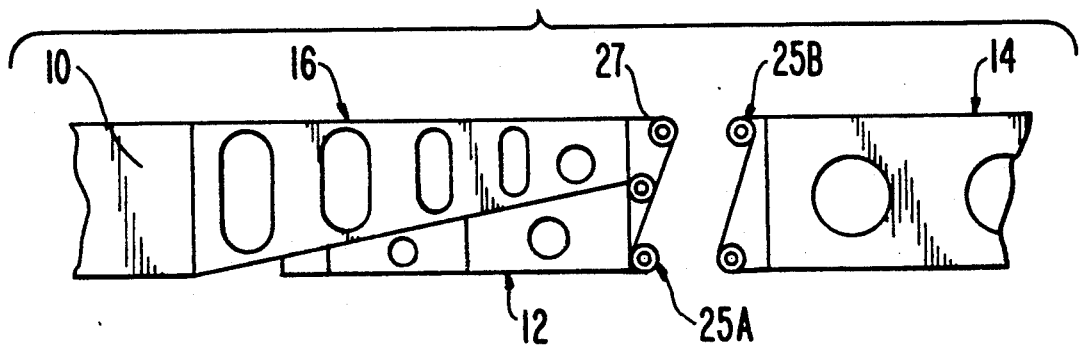

Preferably, lugs 27 on ramp extension 16 also act to engage lugs 25A on the first end of ramp toe 12 to fix toe 12 in the extended position, as shown in FIG. 5D. Additional weight is saved by using the single lugs 27 for the dual purpose of locking ramp 10 and door 14 together, as well as locking toe 12 in an extended position. Overall, the entire weight of the retracting toe is low and the moving portions small.

In accordance with the invention, the ramp toe system comprises means for selectively moving the ramp toe between extended and stored positions. As depicted and embodied in FIGS. 6A through 6C the moving means comprises a rotary actuator disposed along a pivot axis of the ramp toe, and operatively connecting the ramp extension and the ramp toe. Rotary actuator 24 comprises a cylinder horizontally disposed to form pivot axis 26 of ramp toe 12, operatively connecting toe 12 and extension 16, as shown in FIG. 6B. Connecting arms 28,29 connect actuator 24 to extension 16 and toe 12. When power (hydraulic or electric) is applied to actuator 24, the arms change angle with respect to each other, causing the ramp toe to extend or retract. FIGS. 6A through 6C show an extension of toe 12 in sequence.

In FIG. 6A toe 12 is retracted to a stored position and arm 29 forms approximately a 270° angle with respect to arm 28. As toe 12 is extended, as shown in FIG. 6B, the arms are separated by an angle of approximately 180°. FIG. 6C depicts the toe in its extended position and arm 29 forms an angle of approximately 100° with arm 28.

As depicted and embodied in FIGS. 7A through 7C, the moving means may also comprise a hydraulic actuator and pushrod operatively connecting the ramp extension and the ramp toe. Hydraulic actuator 30 is disposed at proximal end 23A of extension 16 to operatively connect ramp toe 12 and extension 16. As power is supplied to actuator 30, pushrod 32 connected between actuator 30 and toe 12, either extends or retracts. As shown in FIG. 7A, when toe 12 is retracted to its stored position, pushrod 32 is also retracted. As the pushrod extends, as shown in FIG. 7B, toe 12 is extended toward its final extended position. FIG. 7C shows pushrod 32 and toe 12 fully extended.

Figure 4:
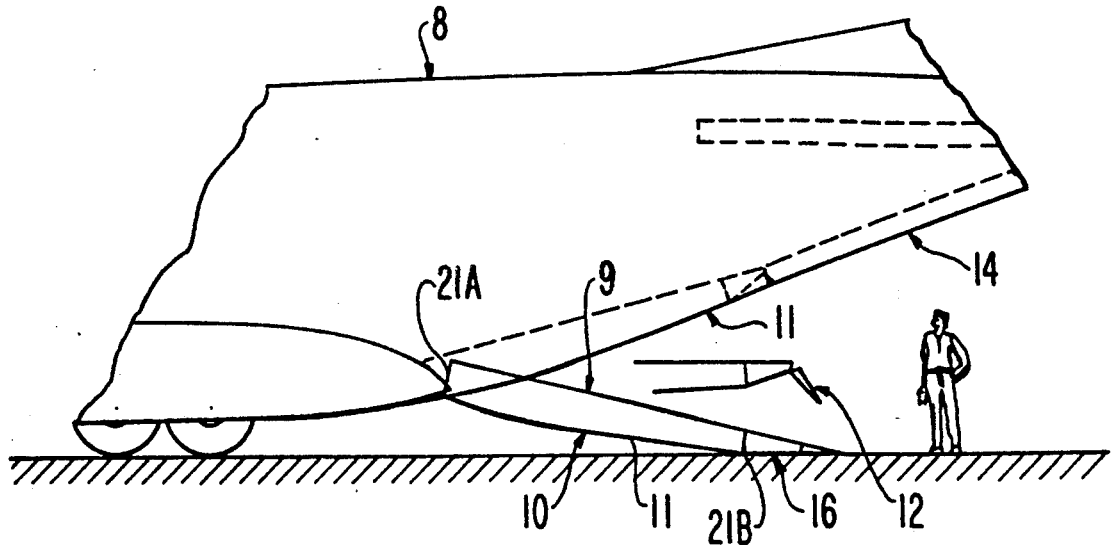
FIG. 4 is a side view of the ramp toe system of the present invention.

When it is desired to use the ramp to unload or load cargo, lugs 25 and 27 are disengaged. Cargo door 14 is opened upwardly and ramp 10 is rotated downwardly, as shown in FIG. 4. As ramp 10 is opened, rotary actuator 24, hydraulic actuator 30 and pushrod 32, or any other equivalent driving means, can be actuated to move ramp toe 12 from its stored position to its extended position, prior to contact of ramp 10 with the aircraft supporting surface, to form a common working surface between ramp 10, extension 16 and toe 12. To close the ramp and door, the above sequence is reversed. An aerodynamically efficient surface is then formed between ramp 10, toe 12, and cargo door 14.

Other embodiments of the invention will be apparent to those skilled in the art from consideration of the specification and practice of the invention disclosed herein. It is intended that the specification be considered exemplary only, with a true scope and spirit of the invention being indicated by the following claims.

What is claimed is:

1. A ramp toe system for use with a ramp of an aircraft, said ramp having internal and external surfaces and being pivotally attached at one end to said aircraft for selective movement between a closed position wherein said eternal surface generally conforms to an outside skin of said aircraft and an open position wherein the other end of said ramp generally is disposed to contact a surface supporting said aircraft, said ramp toe system comprising:
   a ramp extension having a proximal end fixed to the other end of said ramp and extending therefrom to a distal end, said ramp extension having an inside surface generally co-planar with the internal surface of said ramp, and an outside surface convergingly extending from said proximal end to said distal end;
   a ramp toe having first and second opposed ends and first and second opposed surfaces, said first surface convergingly extending from said first end to said second end, the first end of said ramp toe being pivotally attached to said distal end of said ramp extension for selective movement between a stored position wherein said first surface is generally contiguous with the outside surface of said ramp extension and said second surface is generally co-planar with the external surface of said ramp so as to generally conform with the outside skin of the aircraft, and an extended position wherein said first surface is disposed to be generally contiguous with the aircraft support surface and said second surface is generally co-planar with the inside surface of said ramp extension; and
   means for selectively moving said ramp toe between said stored and extended positions.

2. The ramp toe system according to claim 1 wherein said ramp toe and ramp extension correspond in width to said ramp.

3. The ramp toe system according to claim 1 wherein said moving means comprises a rotary actuator disposed along a pivot axis of said ramp toe, and operatively connecting said ramp extension and said ramp toe.

4. The ramp toe system according to claim 1 wherein said moving means comprises a hydraulic actuator and pushrod operatively connecting said ramp extension and said ramp toe.

5. The ramp toe system according to claim 1 also including fixing means for fixing said ramp toe in said extended position.

6. The ramp toe system according to claim 5 wherein said fixing means comprise a first lug disposed on the distal end of said ramp extension and a second lug disposed on the first end of said ramp toe, said first and second lugs being disposed for engagement with each other when the ramp toe is in the extended position.

7. The ramp toe system according to claim 5, further including means for locking said ramp in the closed position.

8. The ramp toe system according to claim 7 wherein said locking means comprises a first lug disposed on the distal end of said ramp extension proximate the inside surface thereof, a second lug disposed on the first end of the ramp toe proximate the second surface thereof, and complementary lugs on said aircraft disposed to engage said first and second lugs when said ramp is in the closed position with the ramp toe in the stored position.

9. The ramp toe system in claim 8 wherein said fixing means comprises said first and second lugs being disposed to engage each other when said ramp toe is in the extended position.

10. The ramp toe system according to claim 1 wherein the first end of said ramp toe is pivotally attached to the distal end of said ramp extension by a hinge disposed proximate the outside surface thereof.

* * * * *

UNITED STATES PATENT AND TRADEMARK OFFICE
CERTIFICATE OF CORRECTION

PATENT NO. : 5,022,610

DATED : June 11, 1991

INVENTOR(S) : THOMAS R. ENSIGN

It is certified that error appears in the above-identified patent and that said Letters Patent is hereby corrected as shown below:

Column 5, line 5, change "eternal" to --external--.

Signed and Sealed this

Twenty-ninth Day of September, 1992

*Attest:*

DOUGLAS B. COMER

*Attesting Officer*     *Acting Commissioner of Patents and Trademarks*